UNITED STATES PATENT OFFICE.

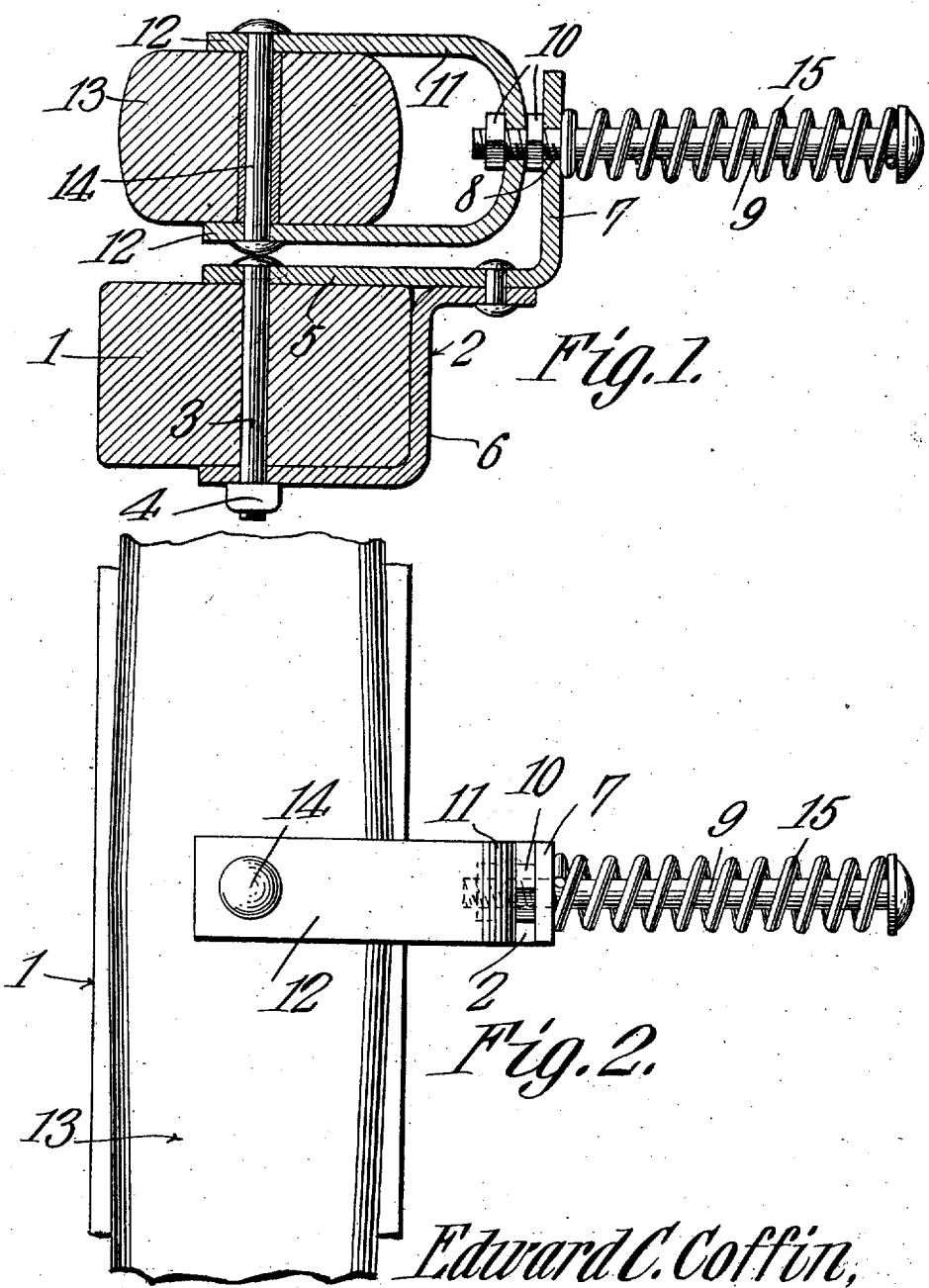

EDWARD CHESTER COFFIN, OF COFFINTON, GEORGIA.

WHIFFLETREE ATTACHMENT.

No. 884,715.　　　　Specification of Letters Patent.　　　Patented April 14, 1908.

Application filed October 10, 1907. Serial No. 396,813.

*To all whom it may concern:*

Be it known that I, EDWARD CHESTER COFFIN, a citizen of the United States, residing at Coffinton, in the county of Stewart and State of Georgia, have invented a new and useful Whiffletree Attachment, of which the following is a specification.

This invention relates to an attachment for yieldingly connecting a whiffletree to the cross bar of a pair of vehicle shafts, the object being to produce a cheap, simple and efficient spring device of few parts, and capable of attachment to any vehicle, having the ordinary whiffletree connection, without forming new holes in the whiffletree or the cross bar. To attain this object, the whiffletree is supported in a clevis or yoke attached to one end of a long rod or bolt passing through a perforation in an arm on a bracket fastened to the cross bar. A coil spring surrounds said bolt between the bracket arm and the head of the bolt and yieldingly connects said yoke to the bracket arm thereby absorbing all shocks and jars and equalizing strains which would otherwise be transmitted to the vehicle.

In the accompanying drawings:—Figure 1 is a vertical cross section through the center of a whiffletree, cross bar and the improved connection. Fig. 2 is a plan view of the same with the ends of the whiffletree and cross bar broken off.

Similar reference numerals are used for like parts on all the figures.

The numeral 1 indicates the cross bar connecting the shafts of a vehicle near their rear ends, to which bar a bracket 2 is fastened by a single bolt 3 passing through the cross bar and the bracket from above downward and secured by a nut 4. The bracket 2 is made as shown in the drawing, of strap metal in two parts riveted together. The bracket has two forwardly projecting arms 5 which extend above and below the connecting bar 1 and are each provided with openings for the securing bolt 3. The arms 5 are connected by a back plate 6 which rests against the rear side of the connecting bar. The bracket extends rearwardly a short distance from the connecting bar on a level with its upper arm 5 and then turns vertically, forming an arm 7 perforated near its upper end as at 8.

A relatively long bolt, bar or rod 9 is slidably mounted in the perforation 8 with its threaded end on the forward side of the arm 7. Rigidly secured to the threaded end of the rod or bolt 9 by lock nuts 10 is a yoke plate or clevis 11 between the arms 12 of which is pivoted the whiffletree 13 on a vertical bolt 14 extending from arm to arm through the center of the whiffletree.

Surrounding the bolt 9 between the arm 7 and the head of said rod or bolt is a strong spring 15 tending to hold the clevis against the bracket arm 7. The tension of the spring 15 is adjusted by the lock nuts 10 on the bolt 9 as is well understood.

The bracket 2 passing as it does above below and on the rear of the cross bar firmly embraces said bar and being fastened thereto by a central through bolt, the draft strain on the cross bar is less than in such attachments that do not pass below said cross bar.

When this device is in use, the draft of the horse will compress the spring 15 in proportion as the resistance offered by the vehicle increases or diminishes, due to the character of the road traveled on. Shocks and jars are thus absorbed and the riding made more comfortable.

I claim:—

A whiffletree attachment comprising a bracket for attachment to the cross bar of a pair of vehicle shafts, said bracket formed of an L-shaped strip of metal the horizontal member of which lies on the upper side of said cross bar and the vertical member extending upwardly, and a second bent strip having an intermediate vertical member bearing on the rear of said cross bar and two horizontal end members extending in opposite directions, the upper of said end members being riveted to the horizontal member of the L-shaped strip and the lower horizontal member extending beneath said cross bar and fastened thereto by a bolt or rivet passing through the cross bar and the L-shaped strip, a yoke pivoted to the whiffletree by a bolt or rivet in vertical line with the fastening bolt for the bracket, a bolt passing horizontally through a hole in the vertical member of the L-shaped strip and adjustably connected to said yoke, and a compression spring surrounding said bolt between its head and said upright member.

In testimony that I claim the foregoing as my own, I have hereto affixed my signature in the presence of two witnesses.

EDWARD CHESTER COFFIN.

Witnesses:
　MILTON WALTON,
　W. B. WILLIFORD.